United States Patent
Marum et al.

(10) Patent No.: US 11,378,506 B2
(45) Date of Patent: Jul. 5, 2022

(54) METHODS AND SYSTEMS FOR MONITORING DRILLING FLUID RHEOLOGICAL CHARACTERISTICS

(71) Applicant: Baker Hughes, a GE company, LLC, Houston, TX (US)

(72) Inventors: Daniela Martins Marum, Celle (DE); Brian Ochoa, Hannover (DE)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 495 days.

(21) Appl. No.: 16/212,999

(22) Filed: Dec. 7, 2018

(65) Prior Publication Data
US 2019/0178770 A1   Jun. 13, 2019

Related U.S. Application Data

(60) Provisional application No. 62/597,503, filed on Dec. 12, 2017.

(51) Int. Cl.
*G01N 11/06* (2006.01)
*E21B 47/06* (2012.01)
(Continued)

(52) U.S. Cl.
CPC .............. *G01N 11/06* (2013.01); *E21B 21/08* (2013.01); *E21B 47/06* (2013.01); *E21B 47/10* (2013.01);
(Continued)

(58) Field of Classification Search
CPC .......... E21B 21/08; E21B 47/06; E21B 47/10; G01N 11/06; G01N 11/08; G01N 2011/006; G01N 2011/0093
See application file for complete search history.

(56) References Cited

U.S. PATENT DOCUMENTS

| 4,440,239 A | 4/1984 | Evans |
| 4,557,142 A | 12/1985 | Hensley et al. |

(Continued)

FOREIGN PATENT DOCUMENTS

| EP | 0458391 A1 | 5/1991 |
| GB | 2516217 A | 1/2015 |

(Continued)

OTHER PUBLICATIONS

Augusto, et al.; "Effect of temperature on dynamic and steady-state shear rheological properties of siriguela (*Spondias purpurea* L.) pulp"; Journal of Food Engineering; 108 (2012) 283-289.

(Continued)

*Primary Examiner* — Roy Y Yi
*Assistant Examiner* — Geoffrey T Evans
(74) *Attorney, Agent, or Firm* — Cantor Colburn LLP

(57) ABSTRACT

Systems and methods for determining fluid rheological characteristics of a fluid used in a subsurface operation are provided. The methods include measuring temperature, pressure, and at least one of a flow rate and a flow velocity of the fluid in a first fluid circuit. A model is based on the temperature, the pressures, and the flow rate or flow velocity. The fluid rheological characteristic of the fluid in a second fluid circuit is determined by measuring a temperature and flow rate and/or flow velocity in the second fluid circuit. The rheological characteristic of the fluid is calculated based on the model employing the temperature and the flow rate/flow velocity of the second fluid circuit.

20 Claims, 4 Drawing Sheets

(51) Int. Cl.
    *G01N 11/00*     (2006.01)
    *E21B 47/10*     (2012.01)
    *G01N 11/08*     (2006.01)
    *E21B 21/08*     (2006.01)

(52) U.S. Cl.
    CPC ........ *G01N 11/08* (2013.01); *G01N 2011/006* (2013.01); *G01N 2011/0093* (2013.01)

(56) References Cited

U.S. PATENT DOCUMENTS

| | | | |
|---|---|---|---|
| 5,063,776 | A | 11/1991 | Zanker et al. |
| 5,140,527 | A | 8/1992 | Jones et al. |
| 5,661,232 | A | 8/1997 | Van Cleve et al. |
| 7,044,237 | B2 | 5/2006 | Leuchtenberg |
| 7,950,451 | B2 | 5/2011 | Alberty |
| 8,024,962 | B2 | 9/2011 | Tonmukayakul et al. |
| 8,086,431 | B2 | 12/2011 | Caldera |
| 8,684,109 | B2 | 4/2014 | Orbell et al. |
| 8,936,111 | B2 | 1/2015 | Maghrabi et al. |
| 9,004,195 | B2 | 4/2015 | Regener et al. |
| 9,568,408 | B2 | 2/2017 | Jamison |
| 2008/0173075 | A1 | 7/2008 | Dale |
| 2009/0293634 | A1 | 12/2009 | Ong et al. |
| 2011/0185795 | A1 | 8/2011 | Colquhoun |
| 2014/0005957 | A1 | 1/2014 | Pihlaja |
| 2014/0345942 | A1* | 11/2014 | Davis ............ E21B 21/10 175/38 |
| 2015/0059446 | A1 | 3/2015 | Agar et al. |
| 2015/0330213 | A1 | 11/2015 | Van Oort et al. |
| 2016/0201412 | A1 | 7/2016 | Midlang et al. |

FOREIGN PATENT DOCUMENTS

| | | |
|---|---|---|
| JP | H0674887 A | 3/1994 |
| WO | 20010002832 A1 | 1/2001 |
| WO | 2015191091 A1 | 12/2015 |

OTHER PUBLICATIONS

Bourgoyne et al.; "Applied Drilling Engineering"; SPE Textbook Series, vol. 2; 1986; First Printing, Society of Petroleum Engineers, Richardson, Tx; pp. 1-223.
Bourgoyne et al.; "Applied Drilling Engineering"; SPE Textbook Series, vol. 2; 1986; First Printing, Society of Petroleum Engineers, Richardson, Tx; pp. 224-380.
Bourgoyne et al.; "Applied Drilling Engineering"; SPE Textbook Series, vol. 2; 1986; First Printing, Society of Petroleum Engineers, Richardson, Tx; pp. 381-502.
Cengel, et al.; "Fluid Mechanics Fundamentals and Applications"; 2006; McGraw Hill, New York, United States of America; pp. 1-119.
Cengel, et al.; "Fluid Mechanics Fundamentals and Applications"; 2006; McGraw Hill, New York, United States of America; pp. 120-235.
Cengel, et al.; "Fluid Mechanics Fundamentals and Applications"; 2006; McGraw Hill, New York, United States of America; pp. 236-421.
Cengel, et al.; "Fluid Mechanics Fundamentals and Applications"; 2006; McGraw Hill, New York, United States of America; pp. 422-620.
Cengel, et al.; "Fluid Mechanics Fundamentals and Applications"; 2006; McGraw Hill, New York, United States of America; pp. 621-766.
Cengel, et al.; "Fluid Mechanics Fundamentals and Applications"; 2006; McGraw Hill, New York, United States of America; pp. 767-929.
Chhabra, et al.; "Non-Newtonian Flow in the Process Industries, Fundamentals and Engineering Applications"; 1999; Butterworth Weinemann, Oxford United Kingdom; pp. 1-210.
Chhabra, et al.; "Non-Newtonian Flow in the Process Industries, Fundamentals and Engineering Applications"; 1999; Butterworth Weinemann, Oxford United Kingdom; pp. 211-421.
Chhabra, R.P.; "Non-Newtonian Fluids: An Introduction"; 2010; Springer, New York, United States of America: 33 pages.
Fann Instrument; "Model 35 Viscometer Instruction Manual"; 2016; Fann Instrument Company, Houston, United States of America; 45 pages.
Franco, et al.; "The Newtonian Fluid"; 2010; Rheology, Encyclopedia of Life Support Systems; Eolss Publishers Co. LTD; Oxford, United Kingdom; 9 pages.
Freescale; "100 kPa On-Chip Temperature Compensated and Calibrated Silicon Pressure Sensors"; Freescale Semiconductor, Inc; 2008; Colorado, United States of America; 10 pages.
Hammand, K.J; "The Flow behavior of a biofluid in a Separated and Reattached Flow Region"; 2015; Journal of Fluids Engineering, 137(6); 10 pages.
International Search Report, International Application No. PCT/US2018/064907, dated Mar. 25, 2019, Korean Intellectual Property Office; International Search Report 4 pages.
International Written Opinion, International Application No. PCT/US2018/064907, dated Mar. 25, 2019, Korean Intellectual Property Office; International Written Opinion 7 pages.
Klotz, et al.; "To Determine Herschel-Bulkey Coefficients"; Nov. 1998; Journal of Petroleum Technology; vol. 60.; 2 pages.
Madlener, et al.; "Generalized Reynolds Number For Non-Newtonian Fluids"; 2009; Progress in Propulsion Physics, vol. 1; EDP Sciences, Paris France; 14 pages.
Partal, et al.; "Non-Newtonian Fluids"; 2010; Rheology—vol. 1. Encyclopedia of Life Support Systems; Eolss Publishers Co. LTD.; Oxford, United Kingdom; 10 pages.
Rao, M. Anandha; "Rheology of Fluid and Semisolid Foods,Principles and Applications"; 2007 Springer Science + Business Media, LLC; New York, NY United States of America; 30 pages.
Steffe, James F.; "Rheological Methods In Food Process Engineering"; 1992; Freeman Press, East Lansing, Unitied States of America; pp. 1-199.
Steffe, James F.; "Rheological Methods In Food Process Engineering"; 1992; Freeman Press, East Lansing, Unitied States of America; pp. 200-417.
Vajargah, et al.; "Automated Drilling Fluid Rheology Characterization with Downhole Pressure Sensor Data"; 2015; Society of Petroleum Engineers; This paper was prepared for presentation at the SPE/IADC Drilling Conference and Exhibition in London, United Kingdom; 22 pages.
Vajargah, et al.; "Automated Fluid Rheology and ECD Management"; SPE International; SPE-180331-MS; 2016; 18 pages.
Vajargah; et al.; "Automated Fluid Rheology and ECD Management";2016; Society of Petroleum Engineers; This paper was prepared for presentation at the SPE Deepwater Drilling & Completions Conference, Galveston Texas, United States of America; 18 pages.
Venkatesan, et al.; "Mathematical Analysis of Casson Fluid Model for Blood Rheology in Stenosed Narrow Arteries"; 2013; Journal of Applied Mathematics; 9 pages.
Yi, X.; "Model for Displacement of Herschel-Bulkley Non-Newtonian Fluid by Newtonian Fluid in Porous Media and Its Application in Fracturing Fluid Cleanup", SPE International Symposium and Exhibition on Formation Damage Control, Louisiana, 2004; 16 pgs.

\* cited by examiner

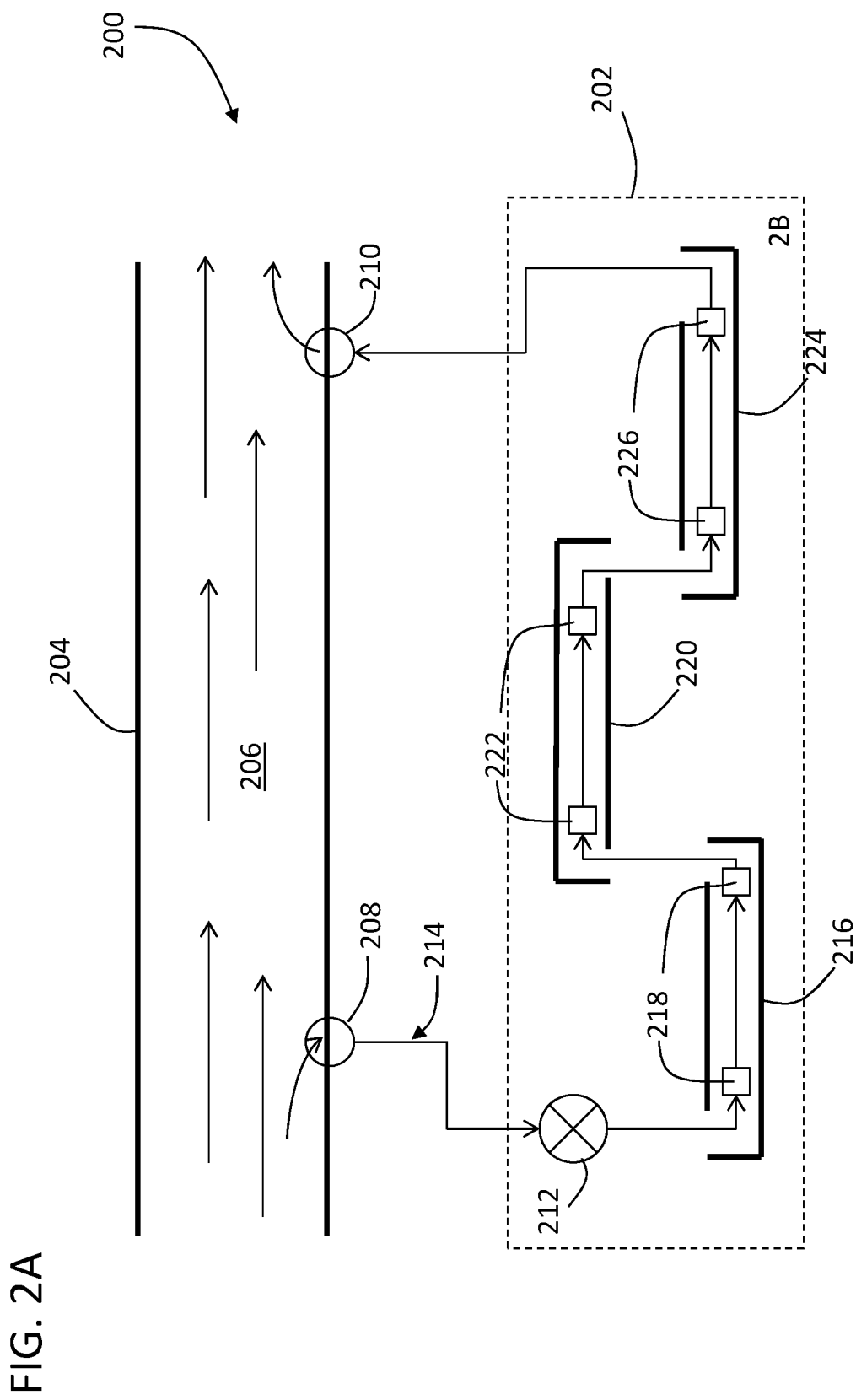

METHODS AND SYSTEMS FOR MONITORING DRILLING FLUID RHEOLOGICAL CHARACTERISTICS

CROSS-REFERENCE TO RELATED APPLICATIONS

The present application claims priority from U.S. Provisional Patent Application No. 62/597,503, filed Dec. 12, 2017. The content of the priority application is hereby incorporated by reference in its entirety.

BACKGROUND

1. Field of the Invention

The present invention generally relates to subsurface operations and monitoring fluid rheological characteristics used for performing subsurface operations.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to energy or a material (e.g., heat, a gas, or fluid) contained in a formation located below the earth's surface. Different types of tools and instruments may be disposed in the boreholes to perform various tasks and measurements.

When performing subsurface operations, and particularly during drilling operation, it is important to know fluid characteristics of the drilling fluid. Such information can enable informed drilling decisions. Accordingly, improved mechanisms for monitoring fluid rheological characteristics may be advantageous.

SUMMARY

Disclosed herein are systems and methods for monitoring fluid rheological characteristics are provided. The methods include measuring temperature, pressure, and at least one of a flow rate and a flow velocity of the fluid in a first fluid circuit. A model is based on the temperature, the pressures, and the flow rate or flow velocity. The fluid rheological characteristic of the fluid in a second fluid circuit is determined by measuring a temperature and flow rate and/or flow velocity in the second fluid circuit. The rheological characteristic of the fluid is calculated based on the model employing the temperature and the flow rate/flow velocity of the second fluid circuit.

The systems includes a first fluid passage in a fluid circuit and a first pressure sensor and a second pressure sensor, the first and the second pressure sensors separated by a first length along the first fluid passage and configured to measure a first pressure value and a second pressure value, respectively. A second fluid passage is fluidly connected to the first fluid passage and a third pressure sensor and a fourth pressure sensor, the third and the fourth pressure sensors separated by a second length along the second fluid passage and configured to measure a third pressure value and a fourth pressure value, respectively. A third fluid passage is fluidly connected to the second fluid passage, with a fifth pressure sensor and a sixth pressure sensor, the fifth and the sixth pressure sensors separated by a third length along the third fluid passage and configured to measure a fifth pressure value and a sixth pressure value, respectively. A temperature sensor is configured to measure a first temperature. At least one of a fluid pump and a flow meter is configured to provide one of a flow rate and a flow velocity. A processor is configured to receive the first, the second, the third, the fourth, the fifth, and the sixth pressure values, the first temperature, at least one of the first flow rate and the first flow velocity, and create a model based thereon, the processor further configured to determine the rheological characteristic using the model.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 2A is a schematic illustration of a fluid monitoring system in accordance with an embodiment of the present disclosure;

DETAILED DESCRIPTION

Figure 1:
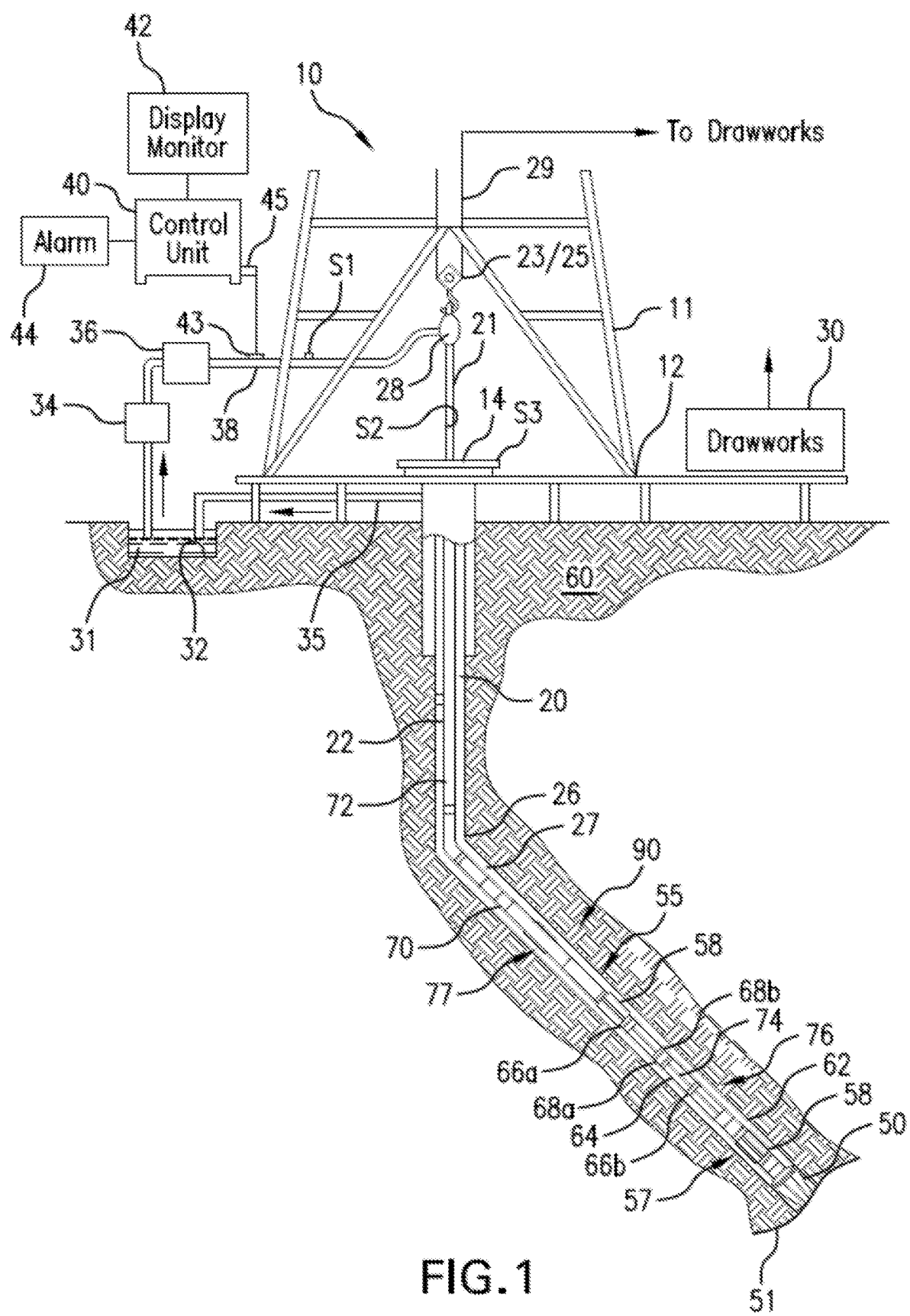
FIG. 1 is an example of a system for performing subsurface operations that can employ embodiments of the present disclosure.

FIG. 1 shows a schematic diagram of a system for performing subsurface operations (e.g., downhole, within the earth or below other surface and into a formation). The system for performing subsurface operations may be, for example, a drilling system, a completion system, a reentry system, or a production system. As shown, the system is a drilling system 10 that includes a drill string 20 having a drilling assembly 90, also referred to as a bottomhole assembly (BHA), conveyed in a borehole 26 (or wellbore) penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling pipe 22, e.g., a tubular, extending downward from the rotary table 14 into the borehole 26. A disintegrating tool 50, such as a drill bit attached to the end of the drilling assembly 90, disintegrates the geological formations when it is rotated to drill the borehole 26. The drill string 20 is coupled to a drawworks 30 via a kelly joint 21, swivel 28, traveling block 25, and line 29 through a pulley 23. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34, also referred to as a fluid pump. The drilling fluid 31 passes into the drill string 20 via a desurger 36, fluid line 38 and the kelly joint 21. Fluid line 38 may also be referred to as a mud supply line, mud fluid line, or drilling fluid line. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate or flow velocity. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the drilling assembly 90.

In some applications the disintegrating tool 50 is rotated by rotating the drill pipe 22. However, in other applications, a drilling motor 55 (such as a mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the formation 60 for a given formation and a drilling assembly largely depends upon the weight on bit and the rotational speed of the disintegrating tool 50. In one aspect of the embodiment of FIG. 1, the drilling motor 55 is coupled to the disintegrating tool 50 via a drive shaft (not shown) disposed in a bearing assembly 57. If a mud motor is employed as the drilling motor 55, the mud motor rotates the disintegrating tool 50 when the drilling fluid 31 passes through the drilling motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and at other suitable locations on the drill string 20 act as centralizers, for example for the lowermost portion of the drilling motor assembly and other such suitable locations.

A surface control unit 40 receives signals from the downhole sensors 70 and devices via a sensor 43 placed in the fluid line 38 as well as from sensors S1, S2, S3, hook load sensors, sensors to determine the height of the traveling block (block height sensors), and any other sensors used in the system and processes such signals according to programmed instructions provided to the surface control unit 40. For example, a surface depth tracking system may be used that utilizes the block height measurement to determine a length of the borehole (also referred to as measured depth of the borehole) or the distance along the borehole from a reference point at the surface to a predefined location on the drill string 20, such as the disintegrating tool 50 (e.g., drill bit) or any other suitable location on the drill string 20 (also referred to as measured depth of that location, e.g. measured depth of the disintegrating tool 50). Determination of measured depth at a specific time may be accomplished by adding the measured block height to the sum of the lengths of all equipment that is already within the wellbore at the time of the block-height measurement, such as, but not limited to drill pipes 22, drilling assembly 90, and disintegrating tool 50. Depth correction algorithms may be applied to the measured depth to achieve more accurate depth information. Depth correction algorithms, for example, may account for length variations due to pipe stretch or compression due to temperature, weight-on-bit, wellbore curvature and direction. By monitoring or repeatedly measuring block height, as well as lengths of equipment that is added to the drill string 20 while drilling deeper into the formation over time, pairs of time and depth information are created that allow estimation of the depth of the borehole 26 or any location on the drill string 20 at any given time during a monitoring period. Interpolation schemes may be used when depth information is required at a time between actual measurements. Such devices and techniques for monitoring depth information by a surface depth tracking system are known in the art and therefore are not described in detail herein.

The surface control unit 40 displays desired drilling parameters and other information on a display/monitor 42 for use by an operator at the rig site to control the drilling operations. The surface control unit 40 contains a computer that may comprise memory for storing data, computer programs, models and algorithms accessible to a processor in the computer, a recorder, such as tape unit, memory unit, etc. for recording data and other peripherals. The surface control unit 40 also may include simulation models for use by the computer to process data according to programmed instructions. The control unit responds to user commands entered through a suitable device, such as a keyboard. The control unit 40 can output certain information through an output device, such as s display, a printer, an acoustic output, etc., as will be appreciated by those of skill in the art. The control unit 40 is adapted to activate alarms 44 when certain unsafe or undesirable operating conditions occur.

The drilling assembly 90 may also contain other sensors and devices or tools for providing a variety of measurements relating to the formation 60 surrounding the borehole 26 and for drilling the borehole 26 along a desired path. Such devices may include a device for measuring formation properties, such as the formation resistivity or the formation gamma ray intensity around the borehole 26, near and/or in front of the disintegrating device 50 and devices for determining the inclination, azimuth and/or position of the drill string. A logging-while-drilling (LWD) device for measuring formation properties, such as a formation resistivity tool 64 or a gamma ray device 76 for measuring the formation gamma ray intensity, made according an embodiment described herein may be coupled to the drill string 20 including the drilling assembly 90 at any suitable location. For example, coupling can be above a lower kick-off subassembly 62 for estimating or determining the resistivity of the formation 60 around the drill string 20 including the drilling assembly 90. Another location may be near or in front of the disintegrating tool 50, or at other suitable locations. A directional survey tool 74 that may comprise means to determine the direction of the drilling assembly 90 with respect to a reference direction (e.g., magnetic north, vertical up or down direction, etc.), such as a magnetometer, gravimeter/accelerometer, gyroscope, etc. may be suitably placed for determining the direction of the drilling assembly, such as the inclination, the azimuth, and/or the toolface of the drilling assembly. Any suitable direction survey tool may be utilized. For example, the directional survey tool 74 may utilize a gravimeter, a magnetometer, or a gyroscopic device to determine the drill string direction (e.g., inclination, azimuth, and/or toolface). Such devices are known in the art and therefore are not described in detail herein.

Direction of the drilling assembly may be monitored or repeatedly determined to allow for, in conjunction with depth measurements as described above, the determination of a wellbore trajectory in a three-dimensional space. In the above-described example configuration, the drilling motor 55 transfers power to the disintegrating tool 50 via a shaft (not shown), such as a hollow shaft, that also enables the drilling fluid 31 to pass from the drilling motor 55 to the disintegrating tool 50. In alternative embodiments, one or more of the parts described above may appear in a different order, or may be omitted from the equipment described above.

Still referring to FIG. 1, other LWD devices (generally denoted herein by numeral 77), such as devices for measuring rock properties or fluid properties, such as, but not limited to, porosity, permeability, density, salt saturation, viscosity, permittivity, sound speed, etc. may be placed at suitable locations in the drilling assembly 90 for providing information useful for evaluating the subsurface formations 60 or fluids along borehole 26. Such devices may include, but are not limited to, acoustic tools, nuclear tools, nuclear magnetic resonance tools, permittivity tools, and formation testing and sampling tools.

The above-noted devices may store data to a memory downhole and/or transmit data to a downhole telemetry system 72, which in turn transmits the received data uphole to the surface control unit 40. The downhole telemetry system 72 may also receive signals and data from the surface control unit 40 and may transmit such received signals and data to the appropriate downhole devices. In one aspect, a mud pulse telemetry system may be used to communicate data between the downhole sensors 70 and devices and the surface equipment during drilling operations. A sensor 43 placed in the fluid line 38 may detect the mud pressure variations, such as mud pulses responsive to the data transmitted by the downhole telemetry system 72. Sensor 43 may generate signals (e.g., electrical signals) in response to the mud pressure variations and may transmit such signals via a conductor 45 or wirelessly to the surface control unit 40. In other aspects, any other suitable telemetry system may be used for one-way or two-way data communication between the surface and the drilling assembly 90, including but not limited to, a wireless telemetry system, such as an acoustic telemetry system, an electro-magnetic telemetry system, a wired pipe, or any combination thereof. The data communication system may utilize repeaters in the drill string or the wellbore. One or more wired pipes may be made up by joining drill pipe sections, wherein each pipe section includes a data communication link that runs along the pipe. The data connection between the pipe sections may be made by any suitable method, including but not limited to, electrical or optical line connections, including optical, induction, capacitive or resonant coupling methods. A data communication link may also be run along a side of the drill string 20, for example, if coiled tubing is employed.

The drilling system described thus far relates to those drilling systems that utilize a drill pipe to convey the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly subsurface. In such application a thruster is sometimes deployed in the drill string to provide the desired force on the disintegrating tool 50. Also, when coiled-tubing is utilized, the tubing is not rotated by a rotary table but instead it is injected into the wellbore by a suitable injector while a downhole motor, such as drilling motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Liner drilling or casing drilling can be one configuration or operation used for providing a disintegrating device that becomes more and more attractive in the oil and gas industry as it has several advantages compared to conventional drilling. One example of such configuration is shown and described in commonly owned U.S. Pat. No. 9,004,195, entitled "Apparatus and Method for Drilling a Wellbore, Setting a Liner and Cementing the Wellbore During a Single Trip," which is incorporated herein by reference in its entirety. Importantly, despite a relatively low rate of penetration, the time of getting a liner to target is reduced because the liner is run in-hole while drilling the wellbore simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different subsurface operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired subsurface operation(s).

In current systems, there is no method or process to obtain, continuously, a rheological characterization of the oil and gas drilling fluids, even though the knowledge of rheological behaviors is critical for the drilling processes, performance optimization, and operational safety. For example, the gas extraction associated with mud logging systems requires insight of the drilling fluid (e.g., mud) rheological profiles at the different temperatures at the borehole outlet. Accordingly, embodiments provided herein are directed to physical processes/systems and mathematical methods/algorithms for obtaining, continuously, rheological data of a drilling fluid. In some embodiments, the systems of the present disclosure can be applied in a drilling rig circulation system.

As appreciated by those of skill in the art, drilling fluids are used to lubricate and cool the drill bit during a drilling operation, suspend drill cuttings in such fluid, and prevent formation fluids from entering into the wellbore. There are three commonly-used drilling fluid types: water-based mud, oil based-mud, and invert emulsion fluid. The water-based drilling fluid typically has water as a main constituent, but may include substituents as seawater, brine, saturated brine, or formate brine with the addition of clays (e.g., bentonite, etc.) and chemical compounds (e.g., potassium formate, lime, silicate, etc.). The oil-based drilling fluid consists of distillated crude oil products complemented with other compounds (e.g., barite, organophilic lignitic, asphaltic and polymeric materials, lime, etc.). The invert emulsion fluid drilling fluid is typically based on oil or synthetic oil (e.g., linear alpha-olefins, isomerized olefins, etc.) mixed with brine having a high salt content.

As appreciated by those of skill in the art, a challenge during drilling processes and operations is the control of the operational parameters of the drilling fluid. The drilling fluids are typically non-Newtonian and, thus, the study and monitoring of the properties of the drilling fluid becomes more complex than Newtonian fluids. The complexity is a result of the non-Newtonian drilling fluid nonlinear rheology behavior (i.e., not linear with respect to a shear rate). For example, a non-Newtonian fluid does not have a constant viscosity, and the behavior of such fluids is distinct for different types of non-Newtonian fluid categories.

Through understanding the characterization and the behavior of each drilling fluid (e.g., type of drilling fluid during operation) can be crucial for control and optimization of the performance of the drilling process. For example, such knowledge can be used for mud gas extraction on a mud logging system. As appreciated by those of skill in the art, the comparison of operational efficiencies can require knowledge of the drilling fluid rheological behavior at different shear rates and temperatures. Accordingly, embodiments provided herein are directed to enabling such comparison with different types of drilling fluids by determining parameters inside a gas trap (e.g., a gas trap fluidly connected to the line 38 shown in FIG. 1, as will be appreciated by those of skill in the art). For example, some embodiments provided herein are directed to obtaining rheological parameters to be used on the Reynolds number to be applied on the study of the gas trap. The determination of the rheological parameter may comprise using a model. In such embodiments, the model may be a lookup table, a database, an algorithm, or an equation, as described herein.

Turning now to FIG. 2A, a schematic illustration of a fluid monitoring system 200 in accordance with a non-limiting embodiment of the present disclosure is shown. The fluid monitoring system 200 includes a pressure drop circuit 202, also referred to as a fluid circuit, arranged to enable extraction of one or more parameters or characteristics of a fluid (e.g., a drilling fluid). As shown, a primary fluid circuit 204 includes a flow of fluid 206 therein. The primary fluid circuit 204 is fluidly connected to a subsurface operation system that is arranged to pump the fluid 206 downhole to operate one or more components located subsurface (e.g., a drilling system that is located downhole). The primary fluid circuit 204 is a pipe or conduit (e.g., fluid line or mud line) for conveying the fluid downhole (e.g. drilling fluid).

To monitor rheological characteristics of the fluid 206, a portion of the fluid 206 is bled from the primary fluid circuit 204. For example, as shown, a first fluid port 208 is arranged on the primary fluid circuit 204 to extract a sample of the fluid 206. The extracted fluid can then be passed through the pressure drop circuit 202 to enable analysis thereof. In some arrangements, the extracted fluid may then be reintroduced into the primary fluid circuit 204 through a second fluid port 210. However, in some embodiments, the extracted fluid may be expelled from the system, stored or used for other purposes, etc. The pressure drop unit may be utilized at a system for performing subsurface operations, such as drilling. In some embodiments, the pressure drop unit may be located inside a mud logger cabin or on a rig floor or, alternatively, close to a mud pit. In some embodiments, the pressure drop circuit (i.e., fluid circuit) may be utilized in a laboratory. In such embodiments, the sample of the fluid may be provided by a fluid line in the laboratory.

The pressure drop circuit 202 includes an optional fluid pump 212 (e.g., a centrifugal pump, axial flow pump, positive displacement pump, etc.) that is arranged to extract a portion of the fluid 206 (extracted fluid 214) from the primary fluid circuit 204. Further, in some embodiments, an optional flow meter (e.g., mechanical flow meter, primary flow element, piston meter, etc.) can be arranged with the fluid pump 212 or may be used alternatively to the fluid pump, as will be appreciated by those of skill in the art. The extracted fluid 214 is directed into a first pressure monitoring section 216 comprising a first fluid passage and having a first pressure differential sensor system 218, then into a second pressure monitoring section 220 comprising a second fluid passage and having a second pressure differential sensor system 222, then into a third pressure monitoring section 224 comprising a third fluid section and having a third pressure differential sensor system 226. In some embodiments and as shown in FIG. 2A, the extracted fluid can be (optionally) directed back into the primary fluid circuit 204. Each of the pressure monitoring sections 216, 220, 224 and associated pressure differential sensor systems 218, 222, 226 have different properties to enable the calculations and monitoring described herein.

Figure 2B:
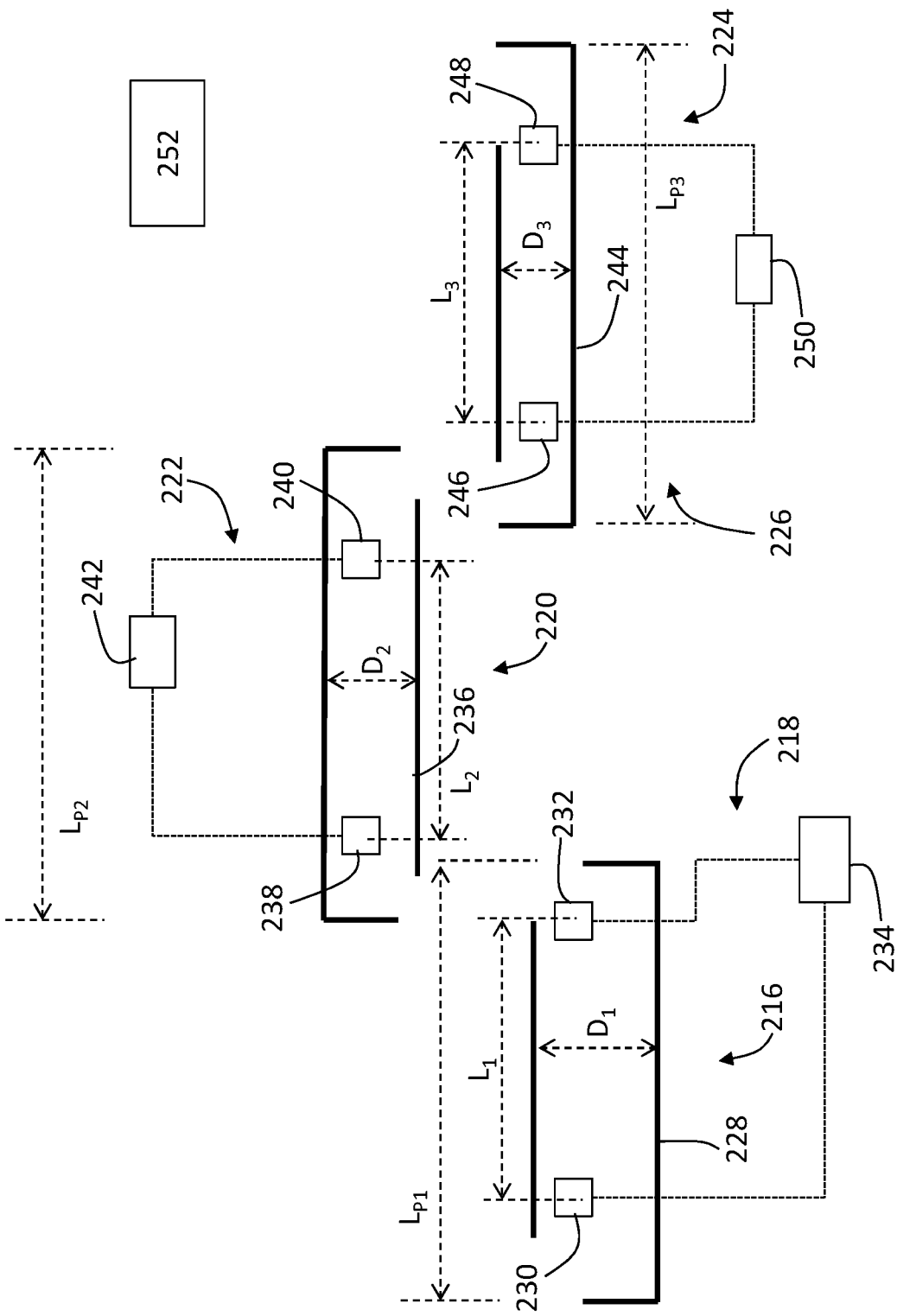
FIG. 2B is an enlarged illustration of a portion of the fluid monitoring system of FIG. 2A, indicated by the box 2B shown in FIG. 2A.

FIG. 2B is an enlarged illustration of the pressure drop circuit 202 shown in FIG. 2A. The pressure drop circuit 202 is arranged to have the same extracted fluid 214 pass through each of the pressure monitoring sections 216, 220, 224, wherein each pressure monitoring section 216, 220, 224 causes the extracted fluid 214 to have a different flow velocity. The flow velocities of the extracted fluid 214 within each pressure monitoring section 216, 220, 224 is controlled by the specific arrangement of each respective pressure monitoring section 216, 220, 224.

For example, the first pressure monitoring section 216 includes a first pipe 228 having a first diameter $D_1$ and a first pipe length $L_{P1}$ with a first pressure differential sensor system 218 arranged therewith. The first pressure differential sensor system 218 includes a first pressure sensor element 230 and a second pressure sensor element 232 separated by a first length $L_1$ (separation length $L_1$) along the first pipe 228. The maximum of the first length $L_1$ separating the first and second pressure sensor elements 230, 232 is the first pipe length $L_{P1}$. The first diameter $D_1$ and the first pipe length $L_{P1}$ are selected to enable fully developed laminar flow within the first pipe 228. The first pressure sensor element 230 and the second pressure sensor element 232 of the first pressure differential sensor system 218 are in communication with a first differential pressure indicator 234. The first differential pressure indicator 234 is arranged to receive fluid pressure information from the first and second pressure sensor elements 230, 232 of the first pressure differential sensor system 218 to measure a differential pressure along the first pipe 228. In some embodiments the first and second pressure sensor elements 230, 232 may be pressure transducers, as will be appreciated by those of skill in the art. The first diameter $D_1$ is selected to cause the extracted fluid to flow at a first flow velocity through the first fluid passage.

Similar to the first pressure monitoring section 216, the second pressure monitoring section 220 includes a second pipe 236 having a second diameter $D_2$ and a second pipe length $L_{P2}$ with a second pressure differential sensor system 222 arranged therewith. The second pressure differential sensor system 222 includes a first pressure sensor element 238 and a second pressure sensor element 240 separated by a second length $L_2$ (separation length $L_2$) along the second pipe 236. The maximum of the second length $L_2$ separating the first and second pressure sensor elements 238, 240 is the second pipe length $L_{P2}$. The second diameter $D_2$ and the second pipe length $L_{P2}$ are selected to enable fully developed laminar flow within the second pipe 236. The first pressure sensor element 238 and the second pressure sensor element 240 of the second pressure differential sensor system 222 are in communication with a second differential pressure indicator 242. The second differential pressure indicator 242 is arranged to receive fluid pressure information from the first and second pressure sensor elements 238, 240 of the second pressure differential sensor system 222 to measure a differential pressure along the second pipe 236. The second diameter $D_2$ is selected such that a second flow velocity, different from the first flow velocity, is achieved for the extracted fluid as it passes through the second flow passage, the second pipe 236, respectively.

The third pressure monitoring section 224 includes a third pipe 244 having a third diameter $D_3$ and a third pipe length $L_{P3}$ with a third pressure differential sensor system 226 arranged therewith. The third pressure differential sensor system 226 includes a first pressure sensor element 246 and a second pressure sensor element 248 separated by a third length $L_3$ (separation length $L_3$) along the third pipe 244. The maximum of the third length $L_3$ separating the first and second pressure sensor elements 246, 248 is the third pipe length $L_{P3}$. The third diameter $D_3$ and the third pipe length $L_{P3}$ are selected to enable fully developed laminar flow within the third pipe 244. The first pressure sensor element 246 and the second pressure sensor element 248 of the third pressure differential sensor system 226 are in communication with a third differential pressure indicator 250. The third differential pressure indicator 250 is arranged to receive fluid pressure information from the first and second pressure sensor elements 246, 248 of the third pressure differential sensor system 226 to measure a differential pressure along the third pipe 244. The third diameter $D_3$ is selected such that a third flow velocity, different from the first and second flow velocities, is achieved for the extracted fluid as it passes through the third fluid passage, the third pipe 244, respectively.

In some embodiments, instead of using a pipe as a flow passage, in the pressure monitoring system, with a circular cross-section, any other shaped cross-section may be used, without departing from the scope of the present disclosure. For example, fluid passages may have geometric cross-sections being quadrangular, triangular, trapezoidal, or any other irregular shape cross-section. The cross-sections of the three flow passages are different in size. In embodiments where the cross-sections are not circular, such cross-sections may be represented by using a parameter representative of the cross-section, such as a diagonal, a lateral length, a circumference, or an area. The flow passage length may be different for all flow passages, but such difference in flow passage length length is not required. In some embodiments, the flow passage lengths may be the same for all three flow passages, while the separation length of the first and second sensors is different for each of the three flow passages.

The differential pressure indicators 234, 242, 250 are in communication with (or are part of) a fluid analysis unit 252. The fluid analysis unit 252 can be an electronic component or a processing unit (e.g., a controller or computer) that receives data collected by the differential pressure indicators 234, 242, 250 to perform analytical operations on such data, as described herein. Although shown and described as three separate differential pressure indicators 234, 242, 250, in some embodiments, a single differential pressure indicator can be in communication with each of the pressure differential sensor system (and the sensor elements thereof) to collect information at a single component. Further, in some embodiments, the differential pressure indicators may be part of or integral with the fluid analysis unit 252. In some embodiments, the fluid analysis unit 252 may be part of a control unit of a drilling system, such as control unit 40 shown in FIG. 1 or part of some other control unit or processors of a drilling system.

Although shown in FIG. 2A with the primary fluid circuit 204 being a pipe or conduit, such arrangement of the pressure drop circuit 202 of the present disclosure is not limited to such a specific configuration. For example, in some embodiments, the first fluid port 208 may be arranged within a fluid pit (e.g., source or mud pit 32 shown in FIG. 1). In some embodiments, the second fluid port of the present disclosure can be located at any suitable location to re-introduce the extracted fluid back into the fluid circuit (e.g., into the fluid pit or into other fluid conduit of the system), and is not limited to being located on or near the location of the first fluid port. In some embodiment, the second fluid port can be arranged to dump out the extracted fluid as waste, or can be arranged to direct the extracted fluid for further analysis, testing, etc. Further, the pressure drop circuits of the present disclosure can be located at any suitable location along a fluid circuit, including, but not limited to, downstream of shakers, connected to mud pits, attached to suction lines or discharge lines, etc. In accordance with some embodiments, the location of the first port of the pressure drop circuits of the present disclosure is selected such that the extracted fluid is "clean." As used herein, a "clean" fluid is a fluid without the presence of contaminates and/or solid materials (e.g., drill cuttings).

A process for continuously monitoring fluid viscosity, rheology, and/or other characteristics of a fluid, in accordance with an embodiment of the present disclosure, will now be described.

The herein described process employs the following initial equations:

$$\tau = k_1 \cdot k_2 \cdot \theta \qquad \text{Eq. (I}_1\text{)}$$

$$\dot{Y} = k_3 \cdot \omega \qquad \text{Eq. (I}_2\text{)}$$

$$\eta_a = \frac{\tau}{\dot{Y}} \cdot 100 \qquad \text{Eq. (I}_3\text{)}$$

In the initial equations Eqs. ($I_1$)-($I_3$), ω corresponds to an applied angular velocity (rpm), θ applied to a dial reading from a viscometer (e.g., a rotational viscometer such as a Couette viscometer or a capillary-type viscometer such as an Ostwald viscometer), $k_1$ is a torsion constant, $k_2$ is a shear stress constant for an effective bob surface, and $k_3$ is a shear rate constant.

As used herein, a yield stress ($\tau_0$) corresponds physically to an initial resistance of the material to change a stable position, requiring some force to start flowing. The structure will only break down and acquire fluidity for shear stresses higher than $\tau_0$. This is applicable to Herschel-Bulkley fluids, which are non-Newtonian fluids and may be representative of one or more types of fluids used during subsurface operations (e.g., drilling operations).

The Herschel-Bulkley generic model (Eq. (1), below) is extremely useful because it can be reduced to the constitutive equations of Newtonian, Power Law (for pseudoplastic and dilatant fluids), and Bingham fluid models.

$$\begin{cases} \tau = \tau_0 + k \cdot \dot{Y}^n, & |\tau| > |\tau_0| \\ \dot{Y} = 0, & |\tau| < |\tau_0| \end{cases} \qquad \text{Eq. (1)}$$

In Eq. (1), τ is the shear stress, $\dot{Y}$ is the shear rate, $\tau_0$ is the yield stress, n is a flow behavior index or "flow index," and k is a consistency coefficient (in $(dyn/cm^2) \cdot s^n$). Eq. (1)

includes three rheological parameters: yield stress (τ), flow index (n), and consistency coefficient (k).

As will be appreciated by those of skill in the art, the yield stress $\tau_0$ of a Herschel-Bulkley fluid has a monotonous falling behavior with temperature:

$$\tau_0 = \tau_{0i} - \tau_{0a} \cdot T \qquad \text{Eq. (2)}$$

In Eq. (2), $\tau_{0i}$ and $\tau_{0a}$ are parameters and T the absolute temperature (in degrees Celsius), as will be appreciated by those of skill in the art.

With respect to the consistency coefficient k, the temperature effect on the consistency coefficient k is commonly described by the Arrhenius equation:

$$k = k_0 \cdot e^{\frac{A}{T+273.15}} \qquad \text{Eq. (3)}$$

In Eq. (3), $k_0$ and A are parameters, as will be appreciated by those of skill in the art.

With respect to flow index n, the flow behavior index n has been shown to present a rising trend with the temperature, which may be fitted by a linear equation:

$$n = n_a \cdot T + n_0 \qquad \text{Eq. (4)}$$

In Eq. (3), $n_a$ and $n_0$ are parameters, as will be appreciated by those of skill in the art.

In view of Eqs. (1)-(4), intermediate rheological parameters identified above, e.g., $k_0$, A, $n_a$, $n_0$, $\tau_{0i}$, and $\tau_{0a}$, have been determined in order to optimize $\tau_0$, k, and n values to obtain the smallest quadratic error deviation relative to values obtained by viscometer experiments.

A laminar volumetric flow rate for the Herschel-Bulkley fluid is represented as:

$$Q_{fluid} = \left(\frac{\pi r^3}{256}\right)\left(\frac{4n}{3n+1}\right)\left(\frac{\tau_w}{k}\right)^{\frac{1}{n}} \qquad \text{Eq. (5)}$$

$$\left(1 - \frac{\tau_0}{\tau_w}\right)^{\frac{1}{n}} \cdot \left[1 - \frac{\tau_0/\tau_w}{2n+1}\left[1 + \frac{2n}{n+1}\left(\frac{\tau_0}{\tau_w}\right)\left(1 + \frac{\tau_0}{\tau_w}\right)\right]\right]$$

Eq. (5) is defined in relation with the Bingham plastic viscosity and yield stress, integrated for each region of a tube (e.g., each section of pipe of a pressure drop circuit of the present disclosure, such as shown and described with respect to FIGS. 2A-2B). Eq. (5) accounts for the shear rate being null when the shear stress is below the yield stress. In Eq. (5), Q is the volumetric flow rate and $\tau_w$ is the shear stress on a pipe wall of the pressure drop circuit, calculated by Eq. (6), below, that includes a differential pressure ΔP, a radius of a pipe r and the length of each pipe section L between the transducers.

$$\tau_w = \frac{(\Delta P) r}{2L} \qquad \text{Eq. (6)}$$

Through Eq. (6), it is concluded that setting the rheological parameters, it is possible to determine a specific pressure drop ΔP for each flow velocity, and vice-versa, allowing embodiments of the present disclosure to predict the fluid rheological behavior for distinct flow velocities.

To determine the pressure drop for each flow, a pressure drop circuit, such as shown and described above, is employed. The pressure drop circuit comprises three pipes of different diameters, as described above. In each pipe of the pressure drop circuit, there are two pressure sensor elements (e.g., pressure transducers) which are connected to respective differential pressure indicators.

As noted above, the pipe lengths are selected to achieve laminar flow. For example, the pipe lengths ($L_1$, $L_2$, $L_3$) must be selected to be larger than $L_{entrance\ laminar}$ predicted by:

$$L_{entrance\ laminar} = 0.05 \cdot D \cdot Re \qquad \text{Eq. (7)}$$

Eq. (7) enables certainty in establishing fully developed laminar flow within a given pipe of the pressure drop circuit. Eq. (7) incorporates a pipe diameter D and a first approximation of the fluid Reynolds number Re:

$$Re = \frac{\rho \cdot v_i^{2-n} \cdot D^n}{\frac{\tau_0}{8}\left(\frac{D}{v_i}\right)^n + k\left(\frac{3m+1}{4m}\right)^n \cdot 8^{n-1}} \qquad \text{Eq. (8)}$$

$$m = \frac{n \cdot k\left(\frac{8v_i}{D}\right)^n}{\tau_0 + k\left(\frac{8v_i}{D}\right)^n} \qquad \text{Eq. (9)}$$

In Eqs. (8) and (9), the density of the fluid ρ and the flow velocity v are employed. The index in Eqs. (8) and (9) represent the device (gas trap or pipe) for which the Reynolds number is calculated. The Reynolds number Re in Eq. (8) is the Herschel-Bulkley generalized Reynolds number that is explicit on Eq. (9). The rheological parameters in this Reynolds equation are given originally by a viscometer, and such obtained rheological parameters may be used as initial or starting values in embodiments of the present disclosure (e.g., when calculating the rheological characteristics of a fluid using an iterative process, algorithm, etc.). The rheological parameters at the end of embodiments of the present disclosure enables, for example, the determination of the Reynolds number inside a gas trap. The differences of the calculations of the gas trap and pipes Reynold numbers are in the velocity equations ($v_{gas\ Trap}$ and $v_{pipe}$, respectively):

$$v_{gas\ trap} = \omega \cdot \pi \cdot d \qquad \text{Eq. (10)}$$

$$v_{pipe} = \frac{Q_{drilling\ fluid}}{\left(\frac{D}{2}\right)^2 \times \pi} \qquad \text{Eq. (11)}$$

In Eq. (10), d is the diameter of the gas trap.

In operation, the fluid analysis unit 252 shown in FIG. 2B will receive differential pressure measurements from the differential pressure indicators 234, 242, 250. The measurements may be obtained from pressure transducers (e.g., pressure sensor elements 230, 232, 238, 240, 246, 248) in the form of a voltage. The voltages can subsequently be converted to pressure drops or differential pressures, as will be appreciated by those of skill in the art. The obtained differential pressures from each pressure monitoring section 216, 220, 224 (and the associated flow velocities obtained through selection of the diameters D) can then be used to obtain the intermediate rheological parameters $k_0$, A, $n_a$, $n_0$, $\tau_{0i}$, and $\tau_{0a}$ as described in the above equations. From this, the fluid (by observation of the extracted fluid) can be characterized.

Figure 3:
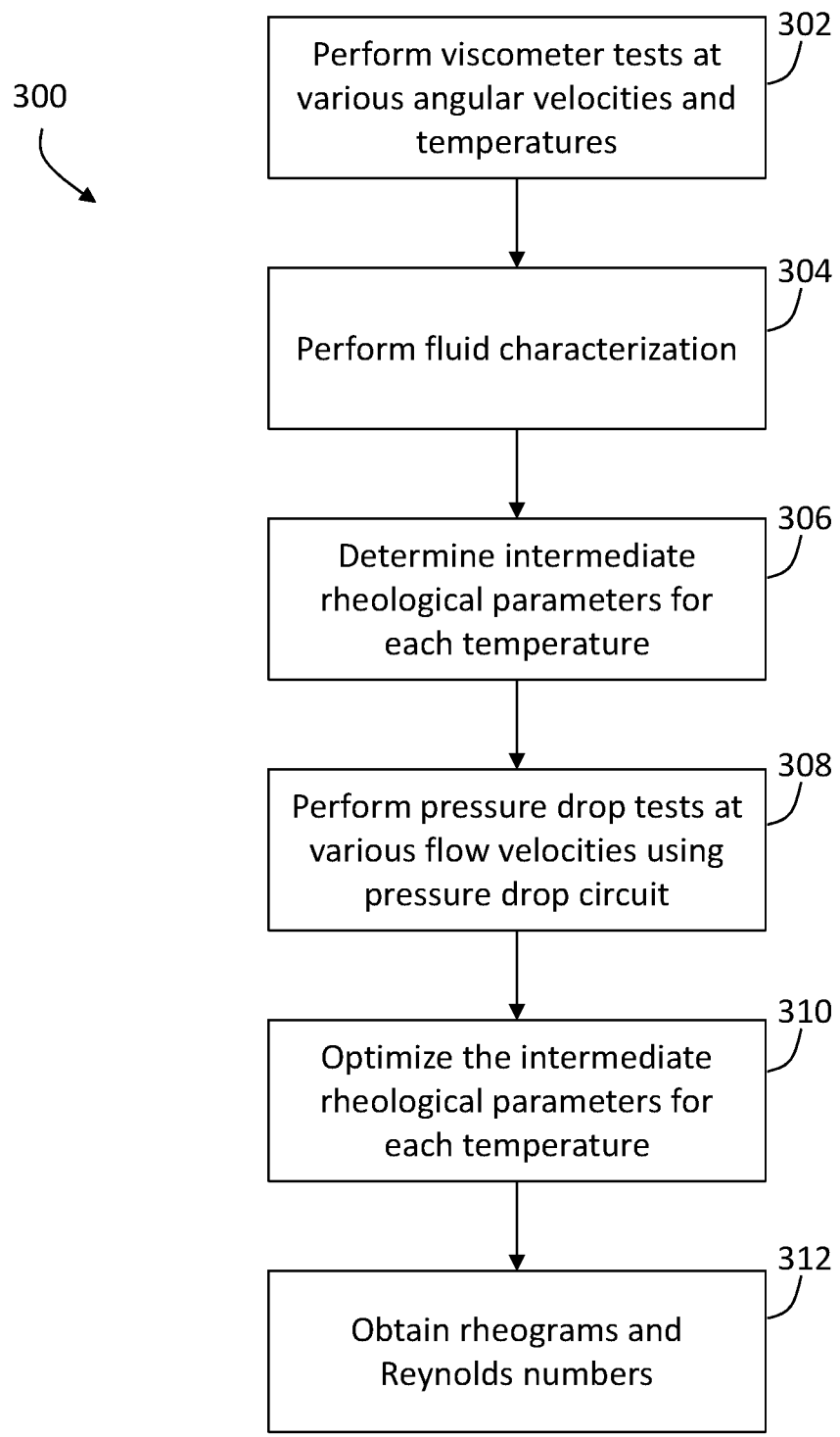
FIG. 3 is a flow process in accordance with an embodiment of the present disclosure.

Turning now to FIG. 3, a flow process 300 in accordance with the present disclosure is shown. The flow process 300 can be implemented using one or more control units, including, but not limited to fluid analysis unit 252.

At block 302, viscometer tests are performed at various angular velocities (parameter in viscometer test) and temperatures. The temperature ranges in one non-limiting example may be 10° C. to 70° C.

At block 304, a fluid characterization is made. For example, block 304 can employ the initial equations Eqs. (I$_1$)-(I$_3$) described above. For example, an apparent viscosity can be obtained for each shear rate. Further, the Herschel-Bulkley model, described herein, is applied for each temperature. The three rheological parameters of the yield-pseudoplastic equation (e.g., initial values $\tau_0$, k, and n) were determined for each temperature, using a non-linear generalized reduced gradient Solver tool, as will be appreciated by those of skill in the art. Instead of a gradient Solver tool, any other software code using any kind of mathematical algorithm may be used. In this process, optimization of the initial values $\tau_0$, k, and n may be performed to have the smallest quadratic error deviation comparing to values obtained by the viscometer tests at block 302.

At block 306, a determination of intermediate rheological parameters for each temperature are obtained. For example, at block 306, the six intermediate parameters $k_0$, A, $n_a$, $n_0$, $\tau_{0i}$, and $\tau_{0a}$ are obtained.

At block 308, pressure drop tests are performed at various flow velocities. The pressure drop tests can employ the pressure drop circuit of embodiments of the present disclosure, shown and described herein. At block 308, a pressure differential $\Delta P$ is obtained for each flow velocity.

At block 310, using the obtained pressure differentials $\Delta P$ are used to determine optimization of the six intermediate parameters $k_0$, A, $n_a$, $n_0$, $\tau_{0i}$, and $\tau_{0a}$ for each temperature.

At block 312, rheograms and Reynolds numbers are obtained, thus enabling monitoring of a fluid viscosity and rheology. The rheograms provide a plot of shear stress versus shear rate (alternatively a shear flow) of the fluid, and the Reynolds numbers provide a ratio of inertial forces to viscous forces and describes a degree of laminar or turbulent flow of the fluid. Thus, flow patterns and flow characteristics can be determined, enabling adjustment of various subsurface operation parameters.

As will be appreciated by those of skill in the art, the rheological characterization of the fluid as provided herein enables prediction of fluid behavior through the various stages of a subsurface process (e.g., drilling). Accordingly, embodiments provided herein can enable improved control and optimization of the operational conditions during a subsurface operation (e.g. flow rate, pressure, temperature, etc.). That is, embodiments provided herein enable an effective mechanism for obtaining consistent final rheological parameters of fluids.

Further, advantageously, the pressure drop circuits of the present disclosure enable a continuous and reliable determination of the apparent viscosity for a yield-pseudoplastic fluid (e.g., drilling fluid).

In one non-limiting example of an application of the process described herein, a description for a water-based operational fluid will now be described. In this example, as described above, a gas extraction on fluid logging systems requires insight of the rheological profiles of the fluid at different temperatures at the borehole outlet. A viscometer is used to measure a water-based operational fluid viscosity at various shear rates (e.g., 3-600 rpm) and temperatures (10-70° C.). The water-based operational fluid rheograms output by the process (e.g., at block 312 of FIG. 3) indicate that the water-based fluid behaves as a yield-pseudoplastic fluid. Accordingly, the Herschel-Bulkley model was employed to predict the shear rate and temperature effects on the shear stress of the water-based operational fluid.

A pressure drop circuit (i.e., fluid circuit) as shown and described above was employed to determine an experimental relationship between the flow velocity of the water-based operational fluid and the pressure drop, and subsequently, the model parameters were optimized, resulting in a model for water-based operational fluids by using:

$$\tau\left(\frac{\text{dyn}}{\text{cm}^2}\right) = \tau_0 - \tau_{0a} \cdot T(° \text{ C.}) + k_0 \cdot \frac{A}{e^{T+273.15}} \cdot \dot{Y}(s^{-1})^{n_a \cdot T + n_0}, \quad \text{Eq. (12)}$$

which leads to:

$$\tau\left(\frac{\text{dyn}}{\text{cm}^2}\right) = 170 - 1.53 \times T(° \text{ C.}) + \quad \text{Eq. (13)}$$
$$0.451 \cdot \frac{957}{e^{T(° \text{ C.})+273.15}} \cdot \dot{Y}(s^{-1})^{0.00597 \cdot T(° \text{ C.})+0.251}.$$

The resulting model represented by Eq. (13) allows for the determination of the rheological characteristic by determining the temperature T and the shear rate $\dot{Y}$. The shear rate $\dot{Y}$ can be calculated by determining the flow velocity or the flow rate and taking the specific flow geometry into account. Both parameters, temperature and flow rate or flow velocity, are easy to measure at a system for performing subsurface operations (e.g., a drilling rig). Thus, the creation of a model like Eq. (13) allows for a determination of characteristic rheological parameters. The characteristic rheological parameters may include, for example, shear stress, viscosity, flow index or Reynolds number by simple measurements at site. The calculation of rheological characteristics may be done for fluids at different locations at the drilling rig, such as downhole locations while drilling. The temperature is measured at various locations in a BHA or a drill string by at least one temperature sensor. Also, the geometry at every location along the BHA or drill string is known. The flow rate of a downhole fluid (e.g., drilling fluid) is known as well. Thus, the calculation of rheological characteristics at each location in the borehole is possible using the model (Eq. (13)). The calculation can be done at the surface when the downhole measured temperature value is transmitted to surface by using a telemetry system.

The knowledge of the rheological characteristics at various locations in the borehole enables engineers (e.g., drilling dynamics and drilling hydraulics engineers, drillers, well planners, geologists) to make better operational decisions and adjust operational parameters according to the calculated rheological characteristics of the downhole fluid, such as, without limitation, adjusting hydrostatic pressure, changing flow rate, adjusting downhole fluid composition (e.g., mud weight), changing Rotations Per Minute (RPM) of the drill string, changing rate of penetration (ROP), adjusting tripping speed, and/or cooling the downhole fluid. All these actions are essential to achieve a proper Equivalent Circulation Density (ECD), which is required to balance well cleaning and well stability and avoiding unwanted formation fractures, kicks (flow of formation fluids in the borehole), and downhole fluid losses.

The rheological characteristics determined by using the created model may be accompanied by surface measured rheological characteristics using measurement methods as known in the art. The surface measured rheological characteristics may be used to do quality checks for the model derived rheological characteristics.

Advantageously, embodiments provided herein can be applied to the fluid that passes through a fluid logging system gas trap, enabling improvements with the comparison of different types of gas extraction processes and analysis.

Further, advantageously, embodiments of the present disclosure provide a system and process for continuously monitoring fluid viscosity and rheology of a fluid during subsurface operations. Such monitoring can enable efficient cleaning of the borehole as cuttings/solids are removed from the borehole. Further, embodiments provided herein enable control of a settling velocity of cuttings within the fluid. Moreover, embodiments provided herein enables determination of an energy to be applied to a fluid to start flow of the fluid (e.g., from a stopped state). Furthermore, embodiments provided herein enable control of loss of circulation and reduce pumping costs associated with subsurface operations.

As provided herein, a pressure drop circuit comprising a pipe/tubing system is used to extract a portion of a fluid. The extracted fluid is diverted through three sections of pipe of the pressure drop circuit, with each pipe section having different dimension (e.g., pipe length, width, and diameter) to achieve different flow velocities within the different sections of pipe. Pressure sensors are located on each section and enable measurement of a differential pressure along a respective section of pipe, and thus an association between a differential pressure and a flow velocity can be obtained. The outputs from the system can enable continuous monitoring of fluid pressure, viscosity, and rheology of the fluid. The monitoring of the fluid may be done in real-time during the subsurface operation. The monitoring may also be performed as a fully automated operation which is controlled by a controller (e.g., processor, computer, etc.) with no or almost no interference/input from a human operator.

Embodiment 1

A method for determining a fluid rheological characteristic of a fluid used in a subsurface operation, the method comprising: measuring a first temperature value, at least four pressure values, and at least one of a first flow rate value and a first flow velocity value of the fluid in a first fluid circuit; creating a model, using a processor, based on the first temperature value, the at least four pressure values, and the at least one of the first flow rate value and the first flow velocity value; determining the fluid rheological characteristic of the fluid in a second fluid circuit, the determination comprising: measuring a second temperature value, and at least one of a second flow rate value and a second flow velocity value of the fluid in the second fluid circuit, and calculating the rheological characteristic of the fluid, using the processor, based on the model employing the second temperature value and the at least one of the second flow rate value and the second flow velocity value.

Embodiment 2

A method accordingly to any of the above described embodiments, wherein the first fluid circuit comprises a first fluid passage and a second fluid passage fluidly connected to the first fluid passage, the first fluid passage having a first cross-section and the second fluid passage having a second cross-section, wherein the first fluid passage comprises a first pressure sensor and a second pressure sensor, and the second fluid passage comprises a third pressure sensor and a fourth pressure sensor, wherein the first and the second pressure sensors are separated by a first separation length along the first fluid passage, and the third and the fourth pressure sensors are separated by a second separation length along the second fluid passage.

Embodiment 3

A method accordingly to any of the above described embodiments, wherein the fluid is a drilling fluid and the first fluid passage is fluidly connectable to one of a fluid line, a mud pit, a shaker, a suction line, or a discharge line.

Embodiment 4

A method accordingly to any of the above described embodiments, wherein the first fluid passage comprises a first pipe having a first diameter and the second fluid passage comprises a second pipe having a second diameter.

Embodiment 5

A method accordingly to any of the above described embodiments, wherein the first pipe has a first pipe length and the second pipe has a second pipe length, wherein the first diameter and the first pipe length are selected to achieve laminar flow in the first pipe, and the second diameter and the second pipe length are selected to achieve laminar flow in the second pipe.

Embodiment 6

A method accordingly to any of the above described embodiments, wherein the first fluid circuit further comprises a third fluid passage fluidly connected to the second fluid passage, the third fluid passage having a third cross-section, wherein the third fluid passage comprises a fifth and a sixth pressure sensor, wherein the fifth and the sixth pressure sensors are separated by a third separation length along the third fluid passage.

Embodiment 7

A method accordingly to any of the above described embodiments, wherein creating the model comprises: using a parameter representative of the first cross-section, a parameter representative of the second cross-section, a parameter representative of the third cross-section, the first separation length, the second separation length, the third separation length, a first pressure value, a second pressure value, a third pressure value, a fourth pressure value, a fifth pressure value, and a sixth pressure value to create the model, and wherein the first cross-section, the second cross-section, and the third cross-section are different.

Embodiment 8

A method accordingly to any of the above described embodiments, wherein the at least four pressure values are measured using at least four respective pressure sensors.

Embodiment 9

A method accordingly to any of the above described embodiments, further comprising adjusting an operational parameter of a subsurface operation based on the determined rheological characteristic.

Embodiment 10

A method accordingly to any of the above described embodiments, wherein the first fluid circuit is located at one of a laboratory and a system for performing a subsurface operation.

Embodiment 11

A method accordingly to any of the above described embodiments, wherein the model is an equation.

Embodiment 12

A method accordingly to any of the above described embodiments, wherein the third pressure monitoring section comprises a third differential pressure indicator arranged to measure a third differential pressure associated with the third pipe.

Embodiment 13

A method accordingly to any of the above described embodiments, wherein the first fluid circuit and the second fluid circuit are the same fluid circuit.

Embodiment 14

A method accordingly to any of the above described embodiments, further comprising: measuring a second temperature in a borehole using a second temperature sensor, wherein a fluid pump and a fluid line are disposed in the borehole; and transmitting the measured second temperature to the surface using a telemetry system.

Embodiment 15

A system for determining a rheological characteristic of a fluid used in a subsurface operation, the system comprising: a first fluid passage in a fluid circuit; a first pressure sensor and a second pressure sensor, the first and the second pressure sensors separated by a first separation length along the first fluid passage and configured to measure a first pressure value and a second pressure value, respectively; and a second fluid passage fluidly connected to the first fluid passage; a third pressure sensor and a fourth pressure sensor, the third and the fourth pressure sensors separated by a second separation length along the second fluid passage and configured to measure a third pressure value and a fourth pressure value, respectively; a third fluid passage fluidly connected to the second fluid passage; a fifth pressure sensor and a sixth pressure sensor, the fifth and the sixth pressure sensors separated by a third separation length along the third fluid passage and configured to measure a fifth pressure value and a sixth pressure value, respectively; a temperature sensor configured to measure a first temperature; at least one of a fluid pump and a flow meter configured to provide one of a flow rate and a flow velocity; and a processor configured to receive the first, the second, the third, the fourth, the fifth, and the sixth pressure values, the first temperature, at least one of the first flow rate and the first flow velocity, and create a model based thereon, the processor further configured to determine the rheological characteristic using the model.

Embodiment 16

A system accordingly to any of the above described embodiments, wherein the first fluid passage has a first cross-section, the second fluid passage has a second cross-section, and the third fluid passage has a third cross-section, wherein each of the first cross-section, the second cross-section, and the third cross-section are different.

Embodiment 17

A system accordingly to any of the above described embodiments, wherein the processor uses a Herschel-Bulkley equation to create the model.

Embodiment 18

A system accordingly to any of the above described embodiments, wherein the determined rheological characteristic is used to adjust an operational parameter of a subsurface operation.

Embodiment 19

A system accordingly to any of the above described embodiments, further comprising: a borehole; a fluid pump; a fluid line; and a second temperature sensor, wherein the second temperature sensor is configured to measure a second temperature in the fluid line, and one of a second fluid pump and a second flow meter is configured to measure one of a second flow rate and a second flow velocity.

Embodiment 20

A system accordingly to any of the above described embodiments, wherein the second temperature is measured in the borehole and is transmitted to the surface using a telemetry system.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" or "substantially" used in connection with a quantity is inclusive of the stated value and has the meaning dictated by the context (e.g., it includes the degree of error associated with measurement of the particular quantity). For example, the phrase "substantially constant" is inclusive of minor deviations with respect to a fixed value or direction, as will be readily appreciated by those of skill in the art.

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed:

1. A method for determining a rheological characteristic of a fluid used in a subsurface operation, the method comprising:
   measuring a first temperature value, at least four first pressure values, and at least one of a first flow rate value and a first flow velocity value of the fluid in a first fluid circuit;
   varying a temperature of the fluid in the first fluid circuit;
   measuring a second temperature value and at least four second pressure values in the first fluid circuit;
   creating a model, using a processor, based on the first temperature value and the second temperature value, the at least four first pressure values, the at least four second pressure values, and the at least one of the first flow rate value and the first flow velocity value, wherein the model is temperature dependent;
   determining the rheological characteristic of the fluid in a second fluid circuit, the determination comprising:
      measuring a third temperature value, and at least one of a second flow rate value and a second flow velocity value of the fluid in the second fluid circuit, and
      calculating the rheological characteristic of the fluid, using the processor, based on the model employing the third temperature value and the at least one of the second flow rate value and the second flow velocity value.

2. The method of claim 1, wherein the first fluid circuit comprises a first fluid passage and a second fluid passage fluidly connected to the first fluid passage, the first fluid passage having a first cross-section and the second fluid passage having a second cross-section, wherein the first fluid passage comprises a first pressure sensor and a second pressure sensor, and the second fluid passage comprises a third pressure sensor and a fourth pressure sensor, wherein the first and the second pressure sensors are separated by a first separation length along the first fluid passage, and the third and the fourth pressure sensors are separated by a second separation length along the second fluid passage.

3. The method of claim 2, wherein the fluid is a drilling fluid and the first fluid passage is fluidly connectable to one of a fluid line, a mud pit, a shaker, a suction line, or a discharge line.

4. The method of claim 2, wherein the first fluid passage comprises a first pipe having a first diameter and the second passage comprises a second pipe having a second diameter and wherein the first pipe has a first pipe length and the second pipe has a second pipe length, wherein the first diameter and the first pipe length are selected to achieve laminar flow in the first pipe, and the second diameter and the second pipe length are selected to achieve laminar flow in the second pipe.

5. The system method of claim 2, wherein the first fluid circuit further comprises a third fluid passage fluidly connected to the second fluid passage, the third fluid passage having a third cross-section, wherein the third fluid passage comprises a fifth and a sixth pressure sensor, wherein the fifth and the sixth pressure sensor are separated by a third separation length along the third fluid passage.

6. The method of claim 5, wherein creating the model comprises:
using a parameter representative of the first cross-section, a parameter representative of the second cross-section, a parameter representative of the third cross-section, the first separation length, the second separation length, the third separation length, a first pressure value, a second pressure value, a third pressure value, a fourth pressure value, a fifth pressure value, and a sixth pressure value to create the model, and
wherein the first cross-section, the second cross-section, and the third cross-section are different.

7. The method of claim 1, wherein the at least four first pressure values and the at least four second pressure values are measured using at least four respective pressure sensors.

8. The method of claim 1, further comprising adjusting an operational parameter of a subsurface operation based on the determined rheological characteristic.

9. The method of claim 1, wherein the first fluid circuit is located at one of a laboratory and a system for performing a subsurface operation.

10. The method of claim 1, wherein the model is an equation.

11. The method of claim 1, wherein the first fluid circuit and the second fluid circuit are the same fluid circuit.

12. The method of claim 1, further comprising:
measuring the third temperature value in a borehole, wherein a fluid pump and a fluid line are fluidly connected to the borehole; and
transmitting the measured third temperature value to the surface using a telemetry system.

13. The method of claim 1, wherein the at least four first pressure values define two first differential pressure values and the at least four second pressure values define two second differential pressure values.

14. A method for determining a rheological characteristic of a fluid used in a subsurface operation, the method comprising:
measuring a first temperature value, at least four pressure values, and at least one of a first flow rate value and a first flow velocity value of the fluid in a first fluid circuit;
creating a model, using a processor, based on the first temperature value, the at least four pressure values, and the at least one of the first flow rate value and the first flow velocity value; and
determining the rheological characteristic of the fluid in a second fluid circuit, the determination comprising:
measuring a second temperature value, and at least one of a second flow rate value and a second flow velocity value of the fluid in the second fluid circuit; and
calculating the rheological characteristic of the fluid, using the processor, based on the model employing the second temperature value and the at least one of the second flow rate value and the second flow velocity value;
wherein the first fluid circuit comprises a first fluid passage and a second fluid passage fluidly connected to the first fluid passage, the first fluid passage having a first cross-section and the second fluid passage having a second cross-section, wherein the first fluid passage comprises a first pressure sensor and a second pressure sensor, and the second fluid passage comprises a third pressure sensor and a fourth pressure sensor, wherein the first and the second pressure sensors are separated by a first separation length along the first fluid passage, and the third and the fourth pressure sensors are separated by a second separation length along the second fluid passage.

15. The method of claim 14, wherein the fluid is a drilling fluid and the first fluid passage is fluidly connectable to one of a fluid line, a mud pit, a shaker, a suction line, or a discharge line.

16. The method of claim 14, wherein the first fluid circuit further comprises a third fluid passage fluidly connected to the second fluid passage, the third fluid passage having a third cross-section, wherein the third fluid passage comprises a fifth and a sixth pressure sensor, wherein the fifth and the sixth pressure sensor are separated by a third separation length along the third fluid passage.

17. The method of claim 14, wherein the first fluid circuit and the second fluid circuit are the same fluid circuit.

18. The method of claim 14, further comprising:
measuring the second temperature value in a borehole, wherein a fluid pump and a fluid line are fluidly connected to the borehole; and
transmitting the measured second temperature value to the surface using a telemetry system.

19. A method for determining a rheological characteristic of a fluid used in a subsurface operation, the method comprising:
measuring a first temperature value, at least four pressure values, and at least one of a first flow rate value and a first flow velocity value of the fluid in a first fluid circuit;
creating a model, using a processor, based on the first temperature value, the at least four pressure values, and the at least one of the first flow rate value and the first flow velocity value, wherein the model is a Herschel-Bulkley equation;
determining the rheological characteristic of the fluid in a second fluid circuit, the determination comprising:
measuring a second temperature value, and at least one of a second flow rate value and a second flow velocity value of the fluid in the second fluid circuit, and
calculating the rheological characteristic of the fluid, using the processor, based on the model employing the second temperature value and the at least one of the second flow rate value and the second flow velocity value.

20. The method of claim 19, wherein the at least four pressure values define two different pressure values.

* * * * *